US007560170B2

(12) United States Patent
Chellappa

(10) Patent No.: US 7,560,170 B2
(45) Date of Patent: Jul. 14, 2009

(54) SURFACE MODIFICATION OF POROUS METAL SUBSTRATES USING COLD SPRAY

(75) Inventor: Anand Chellappa, Albuquerque, NM (US)

(73) Assignee: Intelligent Energy, Inc., Long Beach, CA (US)

( * ) Notice: Subject to any disclaimer, the term of this patent is extended or adjusted under 35 U.S.C. 154(b) by 602 days.

(21) Appl. No.: 10/407,638

(22) Filed: Apr. 4, 2003

(65) Prior Publication Data

US 2004/0197593 A1 Oct. 7, 2004

(51) Int. Cl.
*B32B 5/18* (2006.01)
(52) U.S. Cl. .................. 428/613; 428/687; 428/670; 428/610; 428/615; 428/550
(58) Field of Classification Search .......... 428/613, 428/681, 687, 680, 670, 610, 615
See application file for complete search history.

(56) References Cited

U.S. PATENT DOCUMENTS

| 4,526,839 A | 7/1985 | Herman et al. .............. 428/550 |
| 5,302,414 A | 4/1994 | Alkhimov et al. ........... 427/192 |
| 6,152,987 A * | 11/2000 | Ma et al. ...................... 95/56 |
| 6,408,928 B1 | 6/2002 | Heinrich et al. .............. 164/46 |
| 7,077,889 B2 * | 7/2006 | Chellappa et al. ............. 96/11 |
| 2001/0055694 A1 | 12/2001 | Wada et al. .................. 428/550 |
| 2002/0078827 A1 * | 6/2002 | Thornton ...................... 96/11 |

FOREIGN PATENT DOCUMENTS

JP 06-114247 * 4/1994

OTHER PUBLICATIONS

PCT International Search Report dated Nov. 4, 2004.
"Surface Measurement Parameters for Wyko Optical Profilers", Veeco Instruments, Inc., www.veeco.com, AN505-5-0403, 2003.
"SEM and AFM: Complementary Techniques for High Resolution Surface Investigations", P. Russell, D. Batchelor and J. Thornton, Digital Instruments and Veeco Metrology Group. AN46, Feb. 2001.

* cited by examiner

*Primary Examiner*—John J. Zimmerman
*Assistant Examiner*—Aaron Austin
(74) *Attorney, Agent, or Firm*—Mark Krietzman; Mark Bentley; Luce, Forward, Hamilton & Scripps, LLP

(57) ABSTRACT

A method of preparing the surface of a porous metal substrate to receive a membrane. The method does not substantially decrease the average bulk porosity of the metal substrate. A hydrogen separation membrane supported on the porous metal substrate. A cold spray is used to reduce surface variance. Exposure to an ion beam may also be used after application on the cold spray to prepare the surface of the substrate for membrane deposition.

15 Claims, 4 Drawing Sheets

SURFACE MODIFICATION OF POROUS METAL SUBSTRATES USING COLD SPRAY

CROSS-REFERENCE TO RELATED APPLICATIONS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Field of the Invention

This invention relates generally to the surface modification of substrates, and in particular, to a the surface modification of porous metal substrates using a cold spray of material.

2. Description of Related Art

The growing popularity of portable electronic devices has produced an increased demand for compact and correspondingly portable electrical power sources to energize these devices. Developments in robotics and other emerging technology applications are further increasing the demand for small, independent power sources. At present, storage or rechargeable batteries are typically used to provide independent electrical power sources for portable devices. However, the amount of energy that can be stored in storage or rechargeable batteries is insufficient to meet the need of certain applications.

Hydrogen/air fuel cells (H/AFCs) have enormous potential as a replacement for batteries. Because they can operate on very energy-dense fuels, fuel cell-based power supplies offer high energy-to-weight ratios compared with even state-of-the-art batteries. Fuel cells are of particular interest to the military, where significant efforts are being made to reduce the weight of power supplies that soldiers must carry to support high-tech, field-portable equipment. There is also considerable potential for utilizing fuel cell-based power supplies for commercial applications, particularly for portable applications, where small size and low weight are desirable.

A common H/AFC is a polymer electrolyte membrane (PEM) fuel cell. PEM fuel cells are constructed of an anode and a cathode separated by a polymer electrolyte membrane. Functionally, fuel cells generate electricity by reacting hydrogen with oxygen to produce water. Since oxygen can typically be obtained from the ambient atmosphere, only a source of hydrogen must be provided to operate a fuel cell. Merely providing compressed hydrogen is not always a viable option, because of the substantial volume that even a highly compressed gas occupies. Liquid hydrogen, which occupies less volume, is a cryogenic liquid, and a significant amount of energy is required to achieve the extremely low temperatures required to liquefy gaseous hydrogen. Furthermore, there are safety issues involved with the handling and storage of hydrogen in the compressed gas form or in the liquid form.

One method of producing hydrogen is by processing hydrocarbons such as methane (natural gas), propane, butane, and liquid fuels such as gasoline, diesel and JP-8 or oxygenates such as methanol. The choice of fuel and the choice of the method of processing, such as steam reforming, partial oxidation, and autothermal reforming, depends to a large extent on the type of service, such as, portable, stationary or automotive. Hydrogen can also be produced by cracking ammonia. The product stream from the fuel processor when a hydrocarbon feed is used contains hydrogen in addition to unreacted hydrocarbons, other products such as CO, $CO_2$, and diluents such as nitrogen. In essence, the hydrogen concentration in the product stream can be in the 40 to 75 volumetric percent range depending on the type of fuel and the method of processing. Methods such as water gas shift and preferential oxidation are used to reduce the CO concentrations to acceptable levels of no more than 50 parts per million, but increase the complexity of the system.

One method of separating the hydrogen from the product stream concerns the use of hydrogen separation membranes. These membranes are in general composed of pure palladium or alloys of palladium and can either be supported or unsupported. Supports are usually porous ceramics with porosities in the 40 to 60 percent range. Commercial hydrogen separation membranes are unsupported and are tubular in nature. The separation membranes are composed of one tube or more than one tube that are bundled together and are designed to supply high purity hydrogen, that is, hydrogen which is greater than 99.9 percent pure. The separation membranes are generally limited to operating temperatures below 450° C. due to the sealing techniques used, which is inherent to tubular configurations, and are generally costly. To reduce costs, considerable efforts have been focused on supporting thin membrane layers on porous ceramic support, with porosities in the 40 to 60 percent range. The problem with porous ceramic supports is that the adherence of a metallic membrane to a nonmetallic ceramic substrate is a major problem, particularly when the supported membrane is exposed to thermal cycling between room temperature and elevated temperatures of no less than 400° C. In this case too, the ceramic supports that are evaluated are in the form of tubes, to mimic the construction and service of unsupported commercial membrane modules.

The hydrogen separation membrane, preferably made of pure palladium or palladium alloys, is deposited on the porous substrate by techniques such as electroless plating and electroplating. The substrate is exposed to the precursor metal salts of predetermined compositions in a deliberate fashion, and the salts are subsequently decomposed to yield a metal film or membrane on the support. Achieving a uniform pinhole or crack free membrane is reportedly influenced by the surface morphology and pore size distribution of the ceramic support. In particular, a smooth substrate surface having small pores of no more than 1 micron in diameter and uniform pore size distribution are believed to be desirable. Small pores prevent wicking or seepage of the salt precursors through the pores. A smooth surface favors a uniform membrane deposition, however some level of roughness is needed to provide adhesion. The fact that these properties are possessed by ceramic substrates make them particularly attractive for experimentation and development efforts.

Relatively less focus and efforts have been directed towards the use of porous metal substrates. This is mainly because the porous sintered metals are relatively less porous than the ceramic substrates when compared at similar pore diameters, and therefore allows less gas flow for a defined pressure drop across a given substrate. For example, a porous stainless steel substrate rated as 0.2 micron grade (Mott) has a porosity of only about 7% and a Darcy value of about 0.025. To achieve a high flow rate of gas to the membrane, without a large pressure drop, a porous stainless steel substrate with a porosity of about 30% and a Darcy value of about 0.2 would be useful. However, the synthesis and sintering process during the manufacture of the metal substrates does not allow for pore size and porosity to be varied independent of one another, and to achieve a 30% porosity requires the use of 1.5-2 micron grade porous materials.

In addition, the surface of metal substrates is relatively rough. Typically, techniques used to smoothen the surface, such as shot peening, results in pore closure and consequently decreases porosity. In addition, shot peening has a deleterious effect when the substrate contains large pores of no less than 1 micron. This is because the large metal shots that are needed cause 'pitting' of the surface and increase surface roughness. Even exposure to ion beams, while being less destructive then shot peening, and able to provide relatively consistent pore size, do not provide optimal surface uniformity. The nominal required thickness of a membrane over a porous metal substrate, to avoid pin-holes, gaps and leaks, is directly related to both the pores size and the surface uniformity.

In spite of the above negative characteristics, porous metal substrate based membranes represent a desirable feature for integration with a fuel processor for PEM cell applications. They have higher thermal conductivities than ceramics and therefore result in high heat transfer rates. They can be sealed in a relatively straightforward fashion using welding to components such as reactors, unlike ceramic substrates that need grafoil or soft metal gaskets. Inherently, the metal to metal adhesion of the membrane to the substrate can be expected to be better than that expected using metal-ceramic substrates.

Therefore, it is a desideratum to produce a porous metal substrate with a more uniform surface to receive a membrane.

SUMMARY OF THE INVENTION

According to one aspect of the present invention, a method for preparing the surface of a metal substrate for deposition of a membrane. The method includes exposing a porous metal substrate to particles in a cold spray using the kinetic energy of the particles, sprayed at a high-velocity flow to bond the particles to the substrate through high-speed plastic deformation of the interacting bodies. Cold spray is taught generally in U.S. Pat. No. 5,302,414 issued to Alkhimov et. al.

In one aspect of the invention, the porous metal substrate has a principal surface and a variance, and wherein the surface variance is reduced upon adding material by exposing the first metal substrate to the cold spray without substantially reducing the bulk pore size of the metal substrate.

According to another aspect of the present invention, a device for separating hydrogen from a hydrocarbon fuel processor is provided. The device includes a metal substrate, wherein a surface of the metal substrate has been previously exposed to a cold spray and a membrane has been deposited thereon.

According to another aspect of the present invention, a method for preparing a metallic surface for membrane deposition. The metal substrate is first exposed to an ion beam, to reduce the variance, and then exposed to a cold spray to further reduce the variance.

Other features and advantages of the present invention will be set forth, in part, in the descriptions which follow and the accompanying drawings, wherein the preferred embodiments of the present invention are described and shown, and in part, will become apparent to those skilled in the art upon examination of the following detailed description taken in conjunction with the accompanying drawings or may be learned by practice of the present invention. The advantages of the present invention may be realized and attained by means of the instrumentalities and combinations particularly pointed out in the appendent claims.

Figure 1:
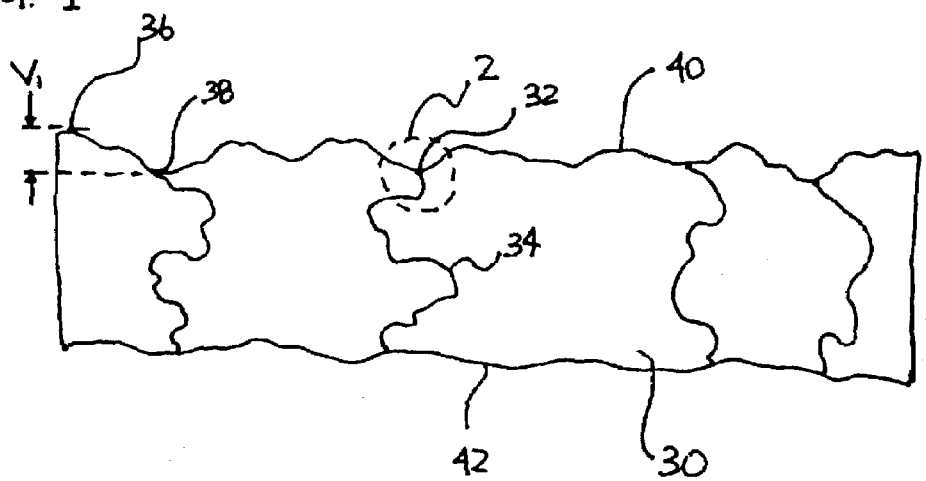
FIG. 1 illustrates a cross-sectional view of a porous metal substrate.

It should be appreciated that for simplicity and clarity of illustration, elements shown in the Figures have not necessarily been drawn to scale. For example, the dimensions of some of the elements are exaggerated relative to each other for clarity. Further, where considered appropriate, reference numerals have been repeated among the Figures to indicate corresponding elements.

DETAILED DESCRIPTION OF THE PREFERRED EMBODIMENTS

The present invention discloses preparing a substrate for deposition of a membrane and forming a separation membrane, such as a hydrogen separation membrane, for separating a product, such a hydrogen, from a mixed product stream including hydrogen, CO, $CO_2$ and hydrocarbons. The separation membrane includes a membrane on a porous metal substrate. To prepare the metal substrate for bonding to the membrane, a surface of the porous metal substrate is modified by exposing the porous metal substrate to a cold spray. Cold spray is used to apply a coating to the surface. Application of the coating is by spraying a gas with fill material particles therein and is typically a high-velocity flow of a material which is in solid state. The term "cold spray" comes from the fact that the temperature at which the spray is occurring is lower than the melting point of the material. One suitable fill material is stainless steel powder (<400 mesh, 40 microns). Other materials include, but are not limited to-nickel, aluminum, copper, and chromium.

The type of material would depend on the operating temperature of the hydrogen separation device. When the temperature is less 400 C , aluminum or copper could be used as the material of choice. Alternately, materials such as chromium which have a high melting point (1907 C) would be particularly beneficial, because in additional to modifying the surface of the porous substrate, they also help in preventing inter-metallic diffusion between the palladium membrane and the porous substrate. Inter-metallic diffusion can reduce the hydrogen flux through the membrane.

The gas—fill material mixture should be imparted an acceleration from 300 to 1200 m/s to provide an adequate kinetic energy to the material to cause bonding. Suitable carrier gases include air, nitrogen, helium the process used by KTech Corporation of Albuquerque, N.Mex. Applying corrosion resistance coatings, conductive coatings or for metallization of plastics is one suitable cold spray process for applying the material.

The kinetic energy of the impact of the fill material on the metal substrate is spent for high-speed plastic deformation of the interacting fill material and metal substrate.

Figure 4:
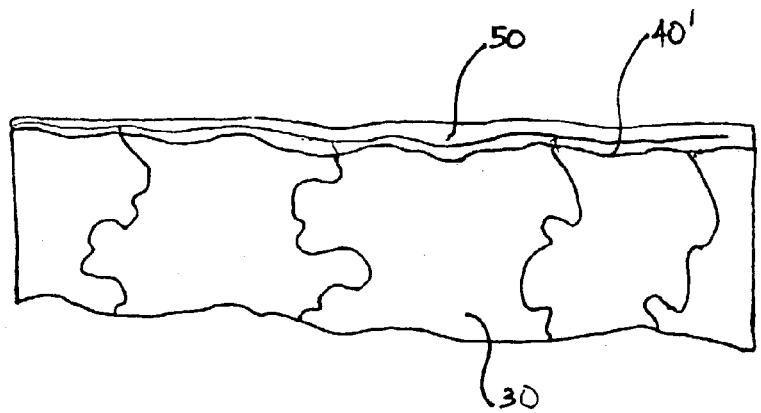
FIG. 4 illustrates a cross-sectional view of a membrane layer overlying the porous metal substrate shown in FIG. 3B.

Shown in FIG. 4 is a separation membrane 20 which includes a membrane 50 on a metal substrate 30. A coating 110 of fill material 100 has been bonded to at least a portion of the top principal surface 40 of the metal substrate 30 to provide a more uniform surface for membrane 50 deposition. The separation membrane 20 is used to separate a product, such a hydrogen, from a mixed product stream.

The separation membrane 20 can be a hydrogen separation membrane used to separate hydrogen from reformed hydrocarbons. Membranes deposited on either side of a metal substrate may be advantageous to provide a separation membrane with membranes on both the principal surface 40 and a second surface 42 (deposited membrane is not shown on the second surface 42) to achieve very high purity. A defect on the membrane on one surface may be compensated by a defect free membrane on the opposing surface.

Figure 2:
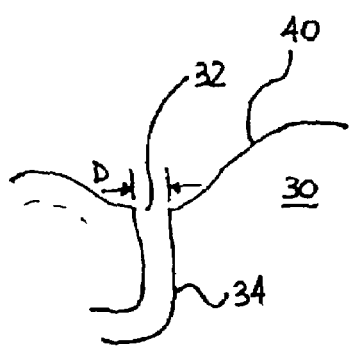
FIG. 2 illustrates an enlarged cross-sectional view of the porous metal substrate shown in FIG. 1.
Figure 2:
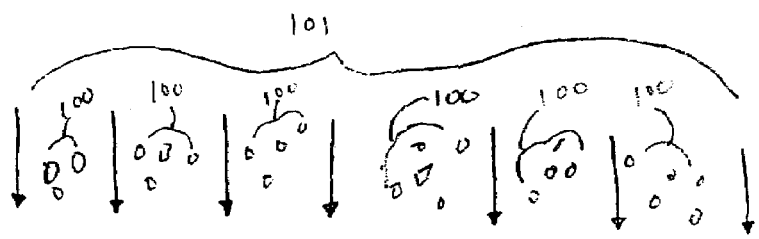

Shown in FIG. 1, in cross-section, is the porous metal substrate 30 prior to processing for use as part of the separation membrane 20. The metal substrate 30 has its principal surface 40 opposed to its second surface 42. The thickness of the metal substrate 30 is determined by the average distance from the principal surface 40 to the second surface 42. Preferably, the thickness of the metal substrate 30 is between about 0.5 and about 5 millimeters, more preferably between about 0.5 and about 3 millimeters. The metal substrate 30 also comprises a series of pores 32 that form channels 34 through the metal substrate 30. As defined herein, the pores 32 define openings to the channels 34. The pore diameter D of the metal substrate 30, as illustrated in FIG. 2, may vary. Before treatment with the cold spray, preferably, the pore diameter D is between about 0.2 and about 100 microns, and more preferably between about 15 and about 50 microns.

Preferably the bulk porosity of the metal substrate 30, before exposure to the cold spray is between about 7% and about 60%, more preferably the bulk porosity is greater than about 30% which corresponds to a Darcy value of about 0.22. A Darcy value represents a flow of 1 cc of 1 cP (viscosity) fluid in 1 second at 1 atmosphere pressure through a 1 cm2×1 cm thick section of porous media.

The principal surface 40 of the metal substrate 30 consists of a series of peaks and valleys. The variance V of the metal substrate 30 is a measure of the surface roughness determined by the measuring the distance between the tallest peak and lowest valley in the principal surface 40. The initial variance $V_1$ of the metal substrate 30 is defined herein as the distance between the tallest initial peak 36 and the lowest initial valley 38. The initial variance $V_1$ of the metal substrate 30 is preferably less than 50 microns.

Figure 3A:
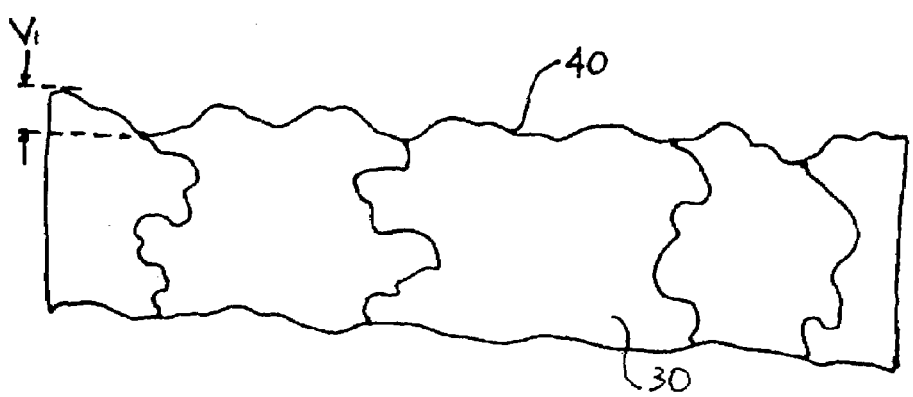
FIG. 3A illustrates a cross-sectional view of the porous metal substrate shown in FIG. 1 being exposed to a cold spray.

In order to reduce the variance V in the principal surface 40 of the metal substrate 30, the principal surface 40 is modified by application of a cold spray stream 10, as illustrated in FIG. 3A. Commonly, cold spray is applied in a application chamber, one such chamber is manufactured by KTech Corporation in Albuquerque, N.Mex.

Application of the material by cold spray at the principal surface 40 of the metal substrate 30 can reduce the variance (surface roughness) of the metal substrate 40 by adding the material 100 in the cold spray stream 101 to the principal surface 40 of the metal substrate 30. Preferably to an average variance of less than about 20 microns, more preferably to an average variance of less than about 10 microns and most preferably to a variance of about 5 microns.

To add or bond the fill material 100 to the metal substrate 30 the cold spray stream 101 may be applied to the surface of the metal substrate 40 at a flow rate of between 30 and 100 cfm.

Figure 3B:
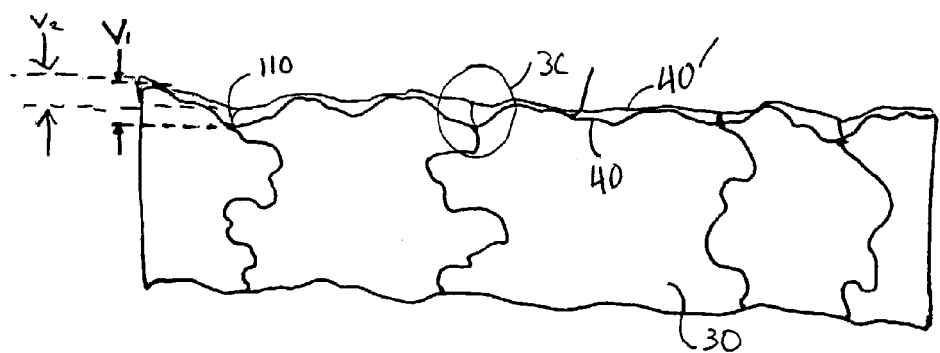
FIG. 3B illustrates a cross-sectional view of the porous metal substrate shown in FIG. 3A after exposure to the cold spray.
Figure 3C:
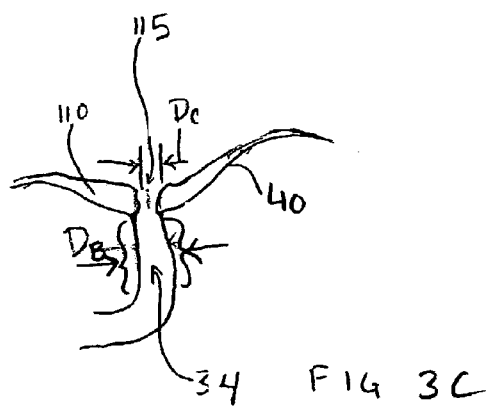
FIG. 3C illustrates an enlarged cross-sectional view of the porous metal substrate shown in FIG. 3B.

After the cold spray stream 101 is applied, the variance V is reduced from the initial variance $V_1$ to an secondary variance $V_2$. The secondary variance $V_2$ of the metal substrate 30 is defined herein as the distance between the tallest peak 46 and the lowest reduced valley 48, as illustrated in FIGS. 3B and 3C. Preferably, the initial variance $V_1$ is reduced by at least fifty percent upon exposing the metal substrate 30 to the cold spray stream 101 and depositing a coating 110 of the fill material 100. Preferably, the secondary variance $V_2$ of the metal substrate 30 is between 1 and 10 microns.

Adding material 100 to the principal surface 40 with the cold spray stream 101 can be used to reduce the initial variance $V_1$ or surface roughness of the principal surface 40 without substantially altering the bulk porosity of the metal substrate 30.

By controlling the particle size of the material 100 and tailoring the flow rate and exposure time of the cold spray stream 101 the coating pore size $D_C$ can be left substantially the same as the average body region pore diameter $D_B$. Alternatively, the coating pore size $D_C$ can be reduced to a diameter less than the pore diameter body region $D_B$, which is preferred.

Accordingly, the coating 110 deposited by cold spray can both reduce the variance V (wherein $V_2 < V_1$) of the coated principal surface 40' (to increase uniformity or smoothness) by filling in the valleys. Cold spray may also reduce the diameter of the top portion 115 of the pores 34 to the diameter of the coating pore size $D_C$ without substantially changing the average body region pore diameter $D_B$. For hydrogen separation membranes it is generally preferred to have a body region pore diameter $D_B$ of about less than 10 microns and a coating pore size $D_C$ of less than about 5 microns and more preferably to reduce the coating pore size $D_C$ to less than about 1 micron.

In addition to providing a more uniform coated principal surface 40' as shown in FIG. 3B, and providing reduced size coating pore size $D_C$ to facilitate membrane deposition, as shown in FIG. 3C, limiting the reduction in the pore 34 size to the coating pore size $D_C$ which is at the top portion 115 provides the added benefit of not substantially changing the bulk porosity of the metal substrate 30. High bulk porosity is preferred as it reduces pressure drops across the separation membrane 20.

A hydrogen separation membrane 50, commonly formed of pure palladium or palladium alloys can be deposited on the porous substrate by techniques that include, but is not limited to electroless plating and electroplating. During electroless plating, the substrate is exposed to the precursor metal salts of predetermined compositions in a deliberate fashion, and the salts are subsequently decomposed to yield a metal film or membrane on the metal substrate 30. Small pore size in the surface region 41 favors uniform membrane 50 deposition. Small pores prevent wicking or seepage of the salt precursors through the pores.

Preferably, a membrane 50 of pure palladium or alloys of palladium has a thickness of between 1 and 10 microns. The forming a thinner membrane saves costs and materials. A thinner membrane is preferred as the hydrogen flux through the membrane is inversely proportional to membrane thickness. Additionally, if the membrane is applied in excess of about 20 microns it can lead to inefficiencies and higher costs, particularly when the hydrogen separation device is part of the fuel processor for producing hydrogen.

Figure 5A:
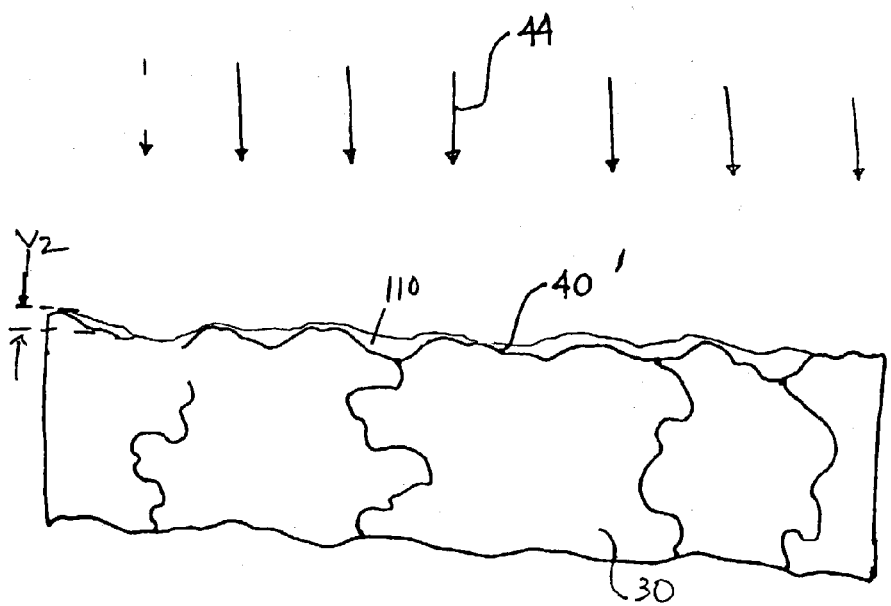
FIG. 5A illustrates a cross-sectional view of the porous metal substrate shown in FIG. 3B being exposed to ion beams.
Figure 5B:
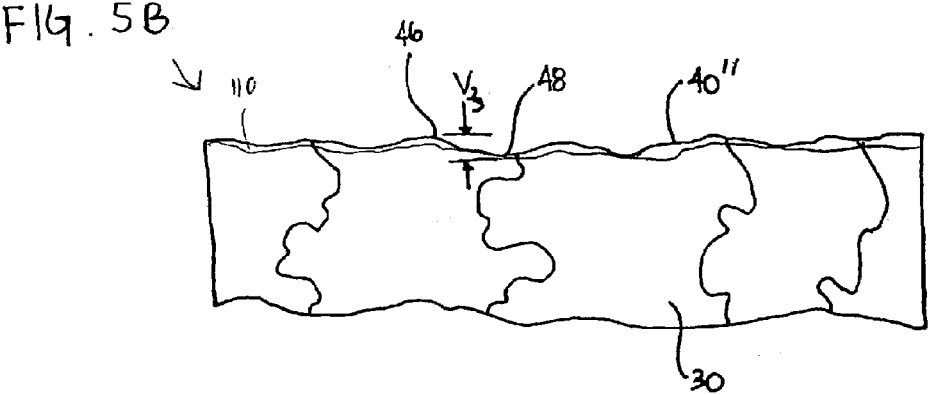
FIG. 5B illustrates a cross-sectional view of the porous metal substrate shown in FIG. 5A after being exposed to ion beams.

To further reduce the secondary variance $V_2$ (increase uniformity and/or smoothness) of the coated principal surface 40' of the metal substrate 30 prior to membrane 50 deposition, the coated principal surface 40' can be modified by exposing the coated principal surface 40' to ion beams 44, as illustrated in FIG. 5A. For example, the metal substrate 30 may be place in an ion beam chamber, and subjected to Ion Beam Surface Treatment QM Technologies in Albuquerque, N.Mex. is one facility which can provide the Ion Beam Surface Treatment. Once inside the ion beam chamber, pulsed ion beams 44 are generated and directed at the coated principal surface 40' of the metal substrate 30. The energy and exposure time of the ion beams may be modified depending on the desired results. For example, ion beam treatment can be used to reduce to the variance of a metal substrate 30 preferably to an average variance of less than about 10 microns, more preferably to an average variance of less than about 5 microns and most preferably to a variance of about 1 microns.

To reduce the average variance the metal substrate 30 is be exposed to ion beams 44 having an energy of between 1 to 5 J/cm$^2$ for a duration of 100 to 150 nano-seconds. The optimal energy and duration of the output will vary with the composite of the metal substrate and/or its initial porosity.

Once exposed to the ion beams, the variance V is reduced from the secondary variance $V_2$ to a tertiary variance $V_3$. The reduced variance $V_2$ of the metal substrate 30 is defined herein as the distance between the tallest reduced peak 46 and the lowest reduced valley 48, as illustrated in FIG. 4A. Preferably, the secondary variance $V_2$ is reduced by about fifty percent upon exposing the metal substrate 30 to the ion beam 44. Preferably, the tertiary variance $V_3$ of the metal substrate 30 is between 1 and 5 microns.

Figure 5C:
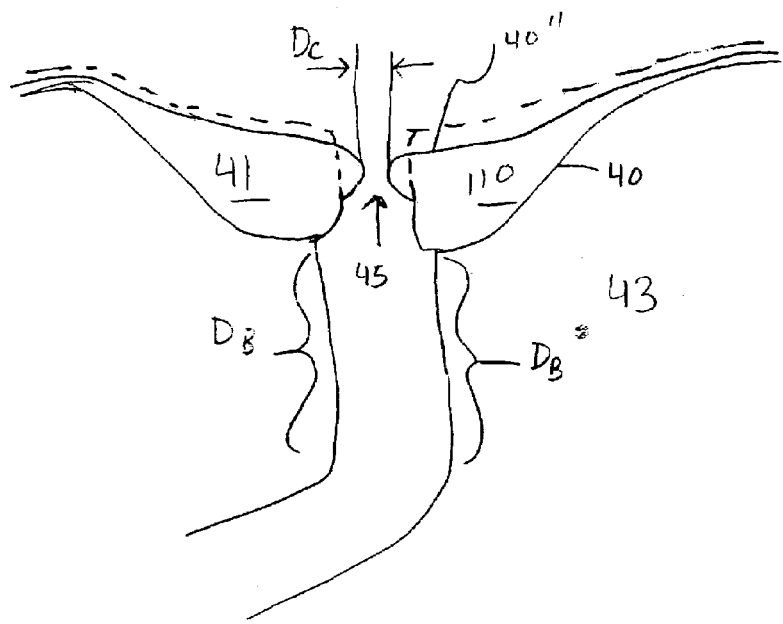
FIG. 5C illustrates an enlarged cross-sectional view of the porous metal substrate shown in FIG. 5B.

Because the ion beam only extends a few microns into the surface region 41 into the metal substrate 30, wherein it heats up and melts the surface region exposure of the metal substrate 30 to an ion beam 44, can reduce the secondary variance $V_2$ of the coated principal surface 40' without substantially altering the bulk porosity of the metal substrate 30. As shown in FIG. 5C, exposure to the ion beam also has an insubstantial effect on the average diameter $D_B$ of the pore size, in the body region 43 of the metal substrate 30. Thus, exposing the metal substrate 30 to ion beams 44 allows the secondary variance $V_2$ of the principal coated surface 40' to be reduced before depositing a membrane 50. Upon reducing the variance V of the metal substrate 30 from the secondary variance $V_2$ to the tertiary variance $V_3$, a membrane 50 can be deposited on the modified coated principal surface 40" of the metal substrate 30 forming the separation membrane 20'.

Figure 6:
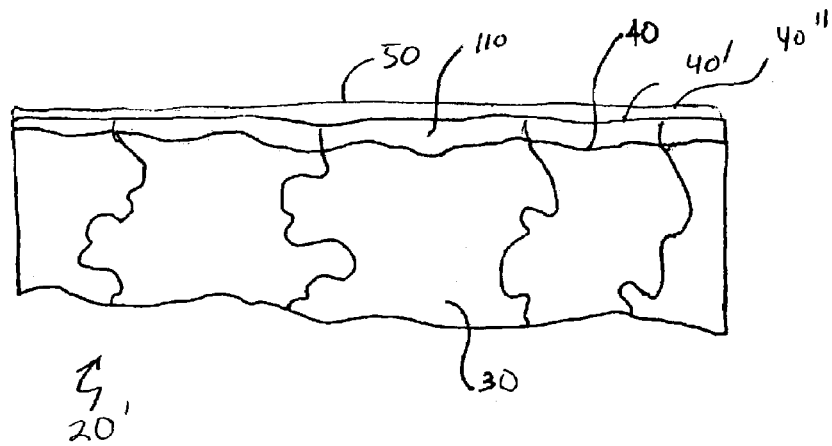
FIG. 6 illustrates a cross-sectional view of a membrane layer overlying the porous metal substrate shown in FIG. 5B.

The above described exposure to the ion beam does not substantially reduce the bulk porosity of the metal substrate. However, in some case the exposure to ion beams can also reduce the average coating pore size $D_C$ in the surface region 41 while the average pore diameter $D_B$ in the body region 43 is substantially unaltered thus maintaining the bulk porosity. As shown in FIG. 5C the alteration of the average coating pore size $D_C$ in the surface region 41 forms a "bottleneck" 45. Preferably the exposure to the ion beam is sufficient to reduce the average coating pore size $D_C$ in the surface region to about 10 to 20 microns, more preferably to about 5 to 10 microns and most preferably to about 1 to 5 microns. Thereafter, as shown in FIG. 6 a membrane 50, such as a hydrogen separation membrane, can be deposited on the modified coated principal surface 40". Preferably, the membrane 50 has a thickness of between 1 and 10 microns.

It should be apparent to those skilled in art, that the surface region of the porous metal substrate may be exposed to the ion beam first and then the cold spray may be applied to prepare the porous metal substrate for membrane deposition and that reordering the steps of ion beam exposure and cold spray application is within the intended scope.

Since certain changes may be made in the above apparatus without departing from the scope of the invention herein involved, it is intended that all matter contained in the above description, as shown in the accompanying drawing, shall be interpreted in an illustrative, and not a limiting sense. It is not intended that the invention be limited to the illustrative embodiments.

The invention claimed is:

1. A porous metal substrate to receive a hydrogen separation membrane, the porous metal substrate comprising:
    a metal substrate with first pores extending therethrough and a principal surface having an initial variance; and
    a coating on the principal surface, formed on the substrate, the coating having second pores extending therethrough to form single continuous apertures with the first pores of the metal substrate, the coating having a coated principal surface with a secondary variance that is less than the initial variance.

2. A porous metal substrate to receive a hydrogen separation membrane, the substrate comprising:
    a metal substrate having a bulk porosity with a first pores extending therethrough and a principal surface that has an initial variance, wherein initial variance is defined as a difference distance between a tallest peak of the principal surface of the metal substrate and a lowest valley of the principal surface of the metal substrate; and
    a coating on the principal surface, formed on the substrate by a material applied by a cold spray, wherein the coating has a second pores extending therethrough and wherein the coated principal surface has a secondary variance which is less than the initial variance, wherein the secondary variance is defined as a difference distance between a tallest peak of the coating on the coated principal surface and a lowest valley of the coating on the coated principal surface without substantially altering the bulk porosity of the metal substrate through the coated principal surface, and wherein the first pore of the metal substrate and the second pore of the coating form a single continuous aperture through the metal substrate and the coating.

3. The porous metal substrate of claim 2, wherein the metal substrate, before addition of the coating material, has an uncoated principal surface average pore size greater than about 0.2 microns.

4. The porous metal substrate of claim 3, wherein the secondary variance of the coated principal surface is about fifty percent less than the initial variance of the uncoated principal surface.

5. The porous metal substrate of claim 2, wherein the diameter of the second pore is less than about 5 microns.

6. A separation membrane comprising:
    a porous metal substrate having a bulk porosity and a coated principal surface coated by application of a cold spray to provide a secondary variance of the coated principal surface less than an initial variance of the principal surface before coating, the metal substrate having a body region and a surface region extending from the body region to the principal surface, wherein initial variance is defined as a difference distance between a tallest peak of the principal surface of the metal substrate and a lowest valley of the principal surface of the metal substrate and wherein the secondary variance is defined as a difference distance between a tallest peak of the coating on the coated principal surface and a lowest valley of the coating on the coated principal surface, the coating and the porous metal substrate having pores extending therethrough to form single continuous apertures without substantially altering the bulk porosity of the porous metal substrate; and a membrane deposited on the coated principal surface.

7. The separation membrane of claim 6 wherein the membrane is permissible to hydrogen.

8. The separation membrane of claim 6, wherein a portion of the pores in the surface region have a smaller average diameter than the pores in the body region.

9. The separation membrane of claim 6, wherein the uncoated metal substrate, before application of the coating had an average pore size greater than about 0.2 microns.

10. The separation membrane of claim 6, wherein the coated principal surface has a secondary variance on the principal surface that is about fifty percent less than was the initial variance of the surface before application of the coating.

11. The separation membrane of claim 6, wherein the pores in the coating is equal to or less than the pores on the porous metal substrate.

12. A porous metal substrate modified to receive a membrane comprising:

a metal substrate having a bulk porosity with first pores extending therethough, its initial principal surface variance having been reduced to a secondary variance by a coating applied with a cold spray without substantially altering the bulk porosity of the coated metal substrate, the coating having second pores extending therethrough to form single continuous apertures with the first pores of the metal substrate, wherein initial variance is defined as a difference distance between a tallest peak of a principal surface of the metal substrate and a lowest valley of the principal surface of the metal substrate and wherein the secondary variance is defined as a difference distance between a tallest peak of the coating on the coated principal surface and a lowest valley of the coating on the coated principal surface, and with its secondary variance reduced to a tertiary variance of the coated principal surface less than the initial and secondary variances by exposure to an ion beam wherein the tertiary variance is defined as a difference distance between a tallest peak of the coating on the coated principal surface and a lowest valley of the coating on the coated principal surface following exposure to the ion beam and pores remain extending through the substrate.

13. A separation membrane comprising:

metal substrate with first pores extending therethough and having a bulk porosity, its initial principal surface variance having been reduced to a secondary variance by a coating applied with a cold spray, the coating having second ores extending therethrough to form single continuous apertures with the first pores of the metal substrate, wherein initial variance is defined as a difference distance between a tallest peak of a principal surface of the metal substrate and a lowest valley of the principal surface of the metal substrate and wherein the secondary variance is defined as a difference distance between a tallest peak of the coating on the coated principal surface and a lowest valley of the coating on the coated principal surface, and with its secondary variance reduced to a tertiary variance of the coated principal surface less than the initial and secondary variances by exposure to an ion beam wherein the tertiary variance is defined as a difference distance between a tallest peak of the coating on the coated principal surface and a lowest valley of the coating on the coated principal surface following exposure to the ion beam and wherein pores remain extending through the substrate and without the coated principal surface substantially altering the bulk porosity of the metal; and a membrane deposited on the principal surface having the tertiary variance.

14. The separation membrane of claim 13 wherein the membrane on the principal surface contains palladium.

15. The separation membrane of claim 14 wherein the membrane is permissible to hydrogen.

\* \* \* \* \*